(12) United States Patent
Jacobson et al.

(10) Patent No.: US 10,375,608 B2
(45) Date of Patent: *Aug. 6, 2019

(54) DUAL NETWORK GEOGRAPHICAL RADIO CONFIGURATION

(71) Applicant: InstrumentMail, LLC, San Francisco, CA (US)

(72) Inventors: Stuart Alexander Jacobson, San Francisco, CA (US); Vimal Bhalodia, East Hanover, NJ (US)

(73) Assignee: InstrumentMail, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,114

(22) Filed: Jul. 27, 2018

(65) Prior Publication Data

US 2018/0376387 A1    Dec. 27, 2018

Related U.S. Application Data

(63) Continuation-in-part of application No. 14/841,437, filed on Aug. 31, 2015.

(51) Int. Cl.

| | |
|---|---|
| *H04W 4/02* | (2018.01) |
| *H04W 36/00* | (2009.01) |
| *H04W 36/32* | (2009.01) |
| *H04W 16/18* | (2009.01) |
| *H04W 8/24* | (2009.01) |
| *H04W 24/02* | (2009.01) |
| *H04W 24/04* | (2009.01) |
| *H04W 64/00* | (2009.01) |

(52) U.S. Cl.
CPC ......... *H04W 36/0066* (2013.01); *H04W 4/02* (2013.01); *H04W 16/18* (2013.01); *H04W 36/0069* (2018.08); *H04W 36/0077* (2013.01); *H04W 36/32* (2013.01); *H04W 8/245* (2013.01); *H04W 24/02* (2013.01); *H04W 24/04* (2013.01); *H04W 64/00* (2013.01)

(58) Field of Classification Search
CPC ... H04W 88/08; H04W 84/045; H04W 88/06; H04W 28/18; H04W 72/0486; H04L 41/0856; H04L 65/1036; H04L 67/04
See application file for complete search history.

(56) References Cited

U.S. PATENT DOCUMENTS

| | | | |
|---|---|---|---|
| 2007/0180130 A1* | 8/2007 | Arnold | H04L 69/18 709/230 |
| 2011/0093913 A1* | 4/2011 | Wohlert | H04L 63/101 726/1 |

(Continued)

*Primary Examiner* — Quan M Hua
(74) *Attorney, Agent, or Firm* — Polsinelli PC

(57) ABSTRACT

Systems, methods, and computer readable mediums for configuring a radio system to provide network service access based on a location of the radio system. The radio system can identify the location and send a location signal indicating its location over a first network. The radio system can receive, over the first network, first configuration data for communicating over a second network based on its location. The radio system can configure itself to communicate over the second network using the first configuration data and subsequently provide network service access over the second network according to the first configuration data.

20 Claims, 6 Drawing Sheets

(56) References Cited

U.S. PATENT DOCUMENTS

| | | | |
|---|---|---|---|
| 2011/0268044 A1* | 11/2011 | Yun | H04W 24/00 370/329 |
| 2013/0003680 A1* | 1/2013 | Yamamoto | G01S 5/0205 370/329 |
| 2013/0029630 A1* | 1/2013 | Salkini | H04L 63/10 455/404.1 |

* cited by examiner

DUAL NETWORK GEOGRAPHICAL RADIO CONFIGURATION

CROSS-REFERENCE TO RELATED APPLICATIONS

This application is a continuation-in-part of U.S. patent application Ser. No. 14/841,437 filed on Aug. 31, 2015, entitled "GEOGRAPHIC RADIO AVAILABILITY AS A SERVICE", the contents of which are hereby expressly incorporated by reference in entirety.

BACKGROUND

Many devices today benefit from wireless connections for much of their functionality. When a person travels to a new location with their devices, a common task is establishing a wireless internet connection (e.g., using WiFi, 4G, LTE, 5G, etc.). Many times, the user cannot find any familiar WiFi connections and must manually connect to a new access point. The user may attempt to connect to various "open" (i.e., unsecured) connections, but these typically lack internet connectivity and, even if they do provide internet access, are slow and fraught with security risks. There may exist a legitimate secured network, but finding the security password can be burdensome. Previous attempts at solving this problem include establishing a network of hotspots that all broadcast the same network name (SSID). However, these hotspots do not provide individualized wireless connections, present security risks (because you share your connection with a potential eavesdropper), and are unable to dynamically adjust to a user's locations and needs.

Cell phones have become commonplace and necessary across various walks of life. Sustained access to a cell phone signal is not only a highly valued convenience for consumers, but has become a critical requirement for many professions. When a person enters a building, particularly buildings with thick or multiple walls, they often lose cell phone signal entirely.

Third-party services facilitating phone communications over WiFi or VOIP services seek to alleviate the problem of poor cell phone coverage within buildings. However, such services are often inadequate, difficult to use, or even pose security risks as they often necessitate the user downloading a third-party application, which may be compromised, onto their phone.

These limitations are particularly burdensome to corporate users that might desire corporate intranet access to their private network or wish to have branded WiFi at a certain location (e.g., a conference room for a client meeting). Building and configuring a wireless network can be time consuming and complex, which can be especially undesirable if the need for the wireless network is only temporary. For example, a company may send an employee to work in a remote location for a short time and it would be prohibitively expensive to establish a private wireless network for the employee. As an alternative, in order to acquire wireless internet access a remote employee typically must learn about an already available WiFi SSID and password and then establish a virtual private network connection between their device and corporate resources.

Developing a long-term wireless network can also present problems and limitations. Traditionally, radio emitter placement within a city can become a complex ordeal, requiring skilled network engineers to configure and place with meticulous precision. Interference, coverage, power, and cost constraints increase the complexity of provisioning a static system. Further, leasing property, building towers, and overcoming regulatory obstructions can be costly and time consuming. At times, there may be motivation to increase the coverage of an existing wireless network, but adding towers can similarly be inconvenient or expensive. One approach is to permit users to purchase and install "microcells" that connect to the internet via cable. However, these microcell units can interfere with existing wireless signals and are not dynamically configurable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for provisioning and managing a radio virtual machine.

An example system can have a processor, a radio, and memory. The memory can have instructions that can be executed by the processor to perform a method. The method can include determining the device's location and sending its location over a network. The method can also include receiving configuration data over the network from a server and using the configuration data to configure the radio for another network. Subsequently, the system can send and receive data from connected devices over this new network.

In some embodiments, the system is housed within a power-strip or similar housing.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
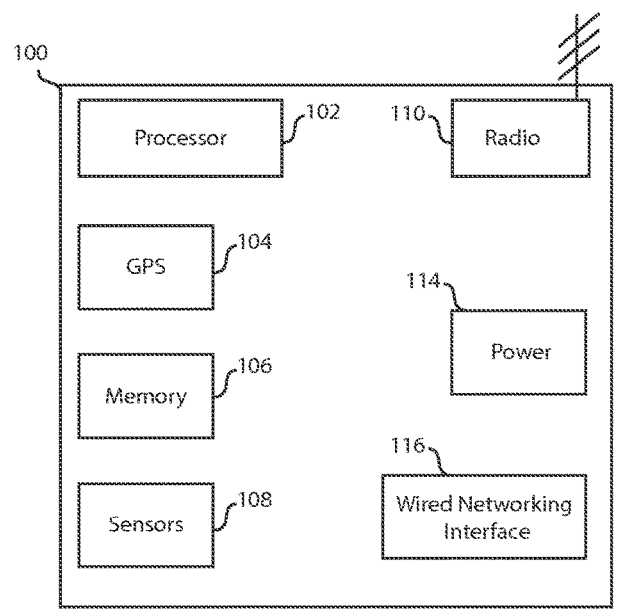
FIG. 1 illustrates an example radio system.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The disclosed technology addresses the need in the art for a geographically available radio as a service.

A wireless infrastructure can be established. For example, a company can plan out and install high powered radio towers in strategic locations. Alternatively, individuals might install low powered radio stations without central control or organization (e.g., WiFi). In some embodiments, a wireless infrastructure can be established using a blended approach of centralized control and individual autonomy. A company (institution, person, etc.) can give radio systems 100 to various people or businesses ("hosts") who in turn can set up and install radio systems 100 as they see fit; the company can then manage and optimize the radio systems 100 remotely. In some embodiments, radio system 100 can be provided at minimal cost to the host, which can be strategically chosen based on their location. A host can connect radio system 100 to their power mains and internet connection. Radio system 100 can also contain extra functionality to entice hosts to use radio system 100 and keep it powered on. For example, radio system 100 can be embedded within another device such as a printer, power strip, home appliance, WiFi router, etc. Such a radio system can be a "set and forget" type of system, requiring minimal maintenance and configuration from the host.

In some embodiments, radio systems 100 are strategically sent to hosts and installed in areas where there is limited wireless availability or the current wireless infrastructure is at capacity. In some embodiments, the radio systems 100 are sent to places that are anticipated to have increased future demand or otherwise have an anticipated need.

After radio system 100 is powered on at a location, a central control server can connect to radio system 100. The central control server can then send configuration data to radio system 100. Configuration data can include broadcast frequencies, broadcast power, connection information (e.g., to connect to another network), etc. Configuration data can be specific to a network, and the radio system 100 can receive configuration data for different networks (e.g., WiFi, cellular, 3G, 4G, LTE, 5G, Bluetooth, NFC, etc.). For example, the radio system 100 can receive configuration data for a cellular network and configuration data for a WiFi connection and subsequently use the configuration data to communicate over the cellular network and the WiFi connection. In one such example, using multiple virtual radios. During or after initialization, central control server can configure or reconfigure radio system 100 according to various needs. For example, a person may desire wireless coverage of a certain type in a certain geographical area during a certain time and, in some examples, a central control server can configure radio systems 100 within the area according to the current needs. In this manner, central control server can make radio systems 100 available for various users in a dynamic and need-based way. This enables the company that manages the radio systems 100 and the central control server to be a provider of "Radio Availability as a Service" (RAaaS) for customers wanting wireless availability in certain areas.

The central control server can communicate with the radio system 100 and vice versa, at least in part, over an applicable network. More specifically, the central control server and the radio system 100 can communicate with each other, at least in part, through a cellular network (e.g., 2G, 3G, 4G, LTE, 5G, etc). For example, the central control server can receive data indicating a device's/radio system's location through a cellular network. Subsequently, the central control server can send configuration data to the radio system 100 over the cellular network. The configuration data to the radio system 100 can be sent from the central control server based on the central control server receiving location data from the radio system 100. For example, the radio system 100 can be turned on and send its location information to the central control server. Subsequently, the central control server can send configuration data to the radio system to enable the device to configure itself to operate at the location at which it is deployed. For example, radio system 100 can configured one or more virtual radios of differing network types (e.g., WiFi, Bluetooth, NFC, etc.).

The radio system 100 can receive new configuration data, e.g. after it has already received configuration data. More specifically, the radio system 100 can receive first configuration data and use the first configuration data to configure itself to operate. Subsequently, the radio system 100 can receive second configuration data and use the second configuration data to reconfigure itself to operate, and so on. For example, the radio system 100 can use received new configuration data to reconfigure itself to operate in different networks, e.g. in a WiFi network, a cellular network, Bluetooth network, etc.

The configuration data, e.g. new configuration data, can be generated by the central control server based on a location of the radio system 100. Specifically, the central control server can generate configuration data for the radio system 100 based on the radio system 100 being within a specific area, e.g. as indicated by location data received at the central control server from the radio system 100. Subsequently, the configuration data can be provided to the radio system 100 which can then be configured, e.g. configure itself, using the configuration data generated based on the radio system 100 being within the specific area.

FIG. 1 depicts an example radio system 100. In some embodiments, radio system 100 includes processor 102, GPS 104, memory 106, sensors 108, radio 110, power component 114 and wired networking interface 116. Processor 102 can coordinate data transfer between various components of radio system 100.

GPS 104 can interpret data from GPS (or similar) satellites to determine radio system 100's position. Because GPS 104 can draw a large amount of power, radio system 100 can also rely on other applicable location identifying techniques to determine radio system 100's position. For example, radio system 100 can learn its location for a neighboring device; it can also detect nearby wireless signals and, can send out "ping" messages, use a database containing the origination location of the nearby wireless signals, or triangulate its position. In some embodiments, radio system 100 is sent (for example, by the company running the RAaaS) to a predetermined location and, before transit, radio system 100 is programmed with its destination location. Radio system 100 can also only use GPS 104 periodically to conserve power.

Radio system 100 can gain environmental awareness using sensors 108. Sensors can include accelerometer(s), gyro(s), ambient light sensors, a button, a camera, barometer, pressure sensor, etc. In some embodiments, sensors 108 can detect persons within the vicinity. In some embodiments, radio system 100 can learn environmental information (location, orientation, etc.) from a neighboring device. Specifically, the radio system 100 can learn environmental information of a neighboring device from either or both data received from the neighboring device and signals received from the neighboring device. For example, the radio system 100 can use a received signal strength of signals received from a neighboring device, e.g. indicated or quantified by a received signal strength indicator (herein referred to as "RSSI"), to identify a location of the neighboring device, e.g. with respect to the radio system. In another example, the radio system 100 can receive data from a neighboring device indicating a geographic location of the neighboring device. Subsequently, the radio system 100 can identify its own position based on the geographic location of the neighboring device, e.g. using a known position of the radio system 100 relative to the neighboring device and the geographic location of the neighboring device.

Radio 110 can send and receive data in compliance with one or a plurality of applicable wireless communication protocols, such as 802.11x (WiFi), FM/AM, NFC, Bluetooth®, Zigbee®, pager, etc. In some embodiments, radio 110 is manufactured specifically for one signal. Alternatively, radio 110 can be reconfigured during operation, for example, it could interpret WiFi signals and then reconfigure for communication using signals of a different frequency. In some embodiments, radio 110 is a software defined radio (SDR). An SDR is a type of radio that can send/receive signals over a spectrum of frequencies simultaneously. In some examples, the SDR can include multiple virtual antennas that can be reconfigured dynamically. For example, the SDR can include a virtual antenna that is first configured to transmit/receive signals over a Bluetooth® connection and is subsequently reconfigured to transmit/receive signals over a WiFI connection. In some embodiments, radio 110 can include a combination of antennas (and corresponding transceivers) for various benefits. For example, multiple antennas can use precoding or beamforming to increase the gain of the signal at a receiver's location or multiple antennas can use spatial multiplexing for greater throughput. Multiple antennas can also operate on diverse frequencies. For example, one antenna can be transmitting AM/FM signals while another operates at higher frequencies (e.g., 2.4 GHz). In other examples, one antenna can be configured for WiFi while another operates at on broadband cellular (e.g., 4G, LTE, 5G, etc.). In some embodiments, multiple protocols that share the same frequency such as Bluetooth®, WiFi, and ZigBee® can share an antenna and can operate simultaneously. Thus configured, radio 110 can transmit and receive signals simultaneously with various devices over a large spread of frequencies and protocols. Radio system 100 also can broadcast or advertise multiple wireless signatures simultaneously (e.g., BSSID, SSID, MAC address, cell tower ID). In some embodiments, radio 110 has a directional antenna, providing increased power along a certain vector, plane, or region. In some embodiments, radio system 100 can include multiple radios 100. The multiple radios 100 can be configured for different frequencies, channels, protocols, clients, etc.

Power component 114 can be an internal power source such as a battery or capacity, an external power source, or a combination of the two. In some embodiments, power component 114 harvests wireless radiation energy for radio system 100's operation. In some embodiments, wireless radiation energy emanates from a power emitter that is separate from radio system 100 to be captured by power component 114. Alternatively, radio system 100 can harvest wireless radiation energy that is ambient electromagnetic energy. In some embodiments, power component 114 provides radio 110 functionality. For example, power component 114 can be connected to a building's electrical network and the wire of the building's electrical network can serve as an antenna for radio system 100. In some embodiments, power component 114 can supply power to external devices as well. For example, radio system 100 can act as a standard "power strip" as described below.

In some embodiments, wired networking interface 116 provides a physical connection to a network. For example, wired networking interface 116 can connect over Ethernet (e.g., IEEE 802.3), cable (e.g., DOCSIS), fiber, telephone, power-line communication, etc. Wired networking interface 116 can connect to an internet backbone for wide area communication. In some embodiments, radio system 100 receives configuration information over wired networking interface 116; this configuration information can include radio 110 settings, frequencies, and protocols. In some embodiments, radio system 100 serves as a wireless base station or access point providing internet gateway services to clients to radio system 100 connected via radio 110.

Figure 2:
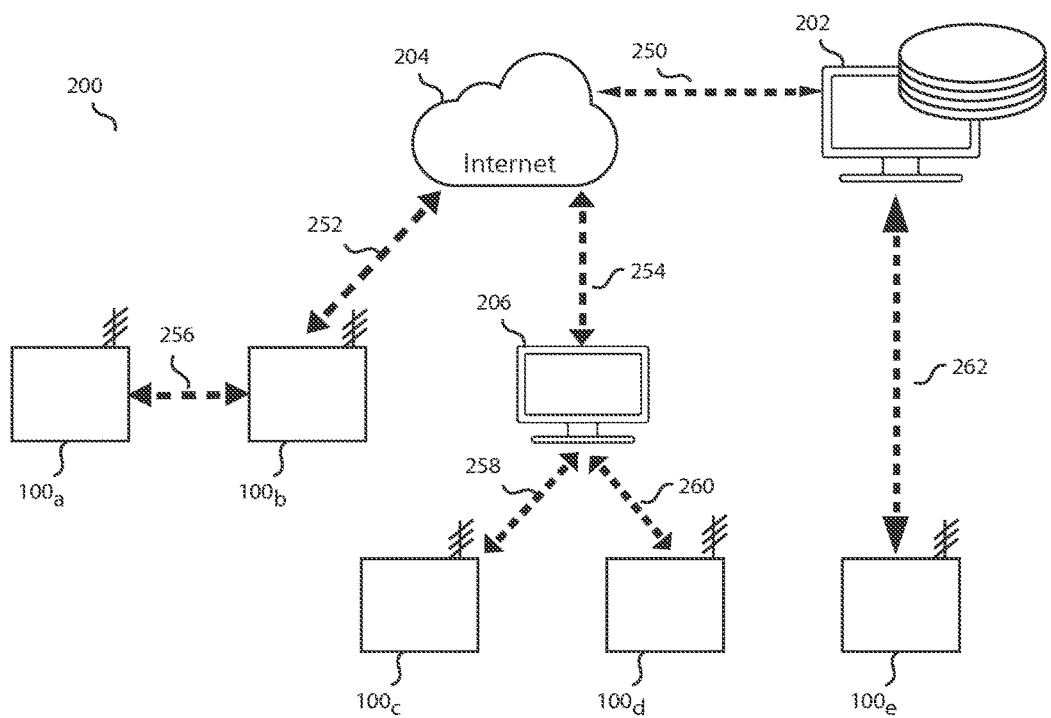
FIG. 2 shows various example connections and networks using radio system.

FIG. 2 shows various example connections and networks using radio system 100. Radio system 100 can communicate with configuration server 202 by various means, shown with radio systems $100_a$-$100_e$ and communication links 250-263. Each of example radio systems $100_a$-$100_e$ represents various network placements of radio system 100. For example, example radio system $100_e$ can directly communicate to configuration server 202. Alternatively, radio system 100 can connect by way of the internet 204, as is done with example radio systems $100_a$-$100_d$. In some embodiments, example radio system $100_a$ can connect directly to radio system $100_b$, which then communicates with configuration server 202, either through internet 204 or other means.

In some embodiments, radio system 100 can connect to backhaul server 206 as depicted with example radio systems $100_c$ and $100_d$. Backhaul server 206 can thus communicate with configuration server 202 and configure example radio systems $100_c$ and $100_d$ according to the communication. Specifically, configuration server 202 can generate configuration instructions, e.g. based on a location of the radio system 100. Subsequently, the backhaul server 206 can configure the radio system 100 based on the configuration instructions generated by the configuration server 202. In some embodiments, configuration server 202 is connected to or runs a configuration administrator platform that can manage the customers that request RAaaS. For example, the configuration administrator platform can receive requests, balance priorities, facilitate automatic or manual bidding for resources, manage billing, detect and orchestrate repairs to radio systems 100 and the network infrastructure, and start and stop services as needed. In some embodiments, radio systems $100_c$ and $100_d$ have limited computational, storage, power, or bandwidth capabilities in comparison to backhaul server 206. In some such embodiments, backhaul server 206 can supplement the capabilities of radio systems $100_c$ and $100_d$. For example, backhaul server 206 can process data received on radio systems $100_c$ and $100_d$. Another example includes backhaul server 206 containing data that is accessible to client machines via radio systems $100_c$ and $100_d$, thus establishing radio systems $100_c$ and $100_d$ as wireless interfaces to backhaul server 206. For example, if radio systems $100_c$ and $100_d$ were positioned in a sports arena, backhaul server 206 can store instant replays of the event in memory; client devices can then access the instant replays via radio systems $100_c$ and $100_d$, avoiding any need for clients to communicate across the internet to other servers. Backhaul server 206 can be a virtual machine or physical system. Although two radio systems $100_c$ and $100_d$ are depicted as being connected to backhaul server 206, more or fewer radio systems can be connected. In some embodiments, backhaul server 206 provides wireless or direct power to radio systems $100_c$ and $100_d$.

Connections 250-262 can be established through various means known in the art. For example, they can be wireless or wired, secured or unsecured, continuous or on-demand, or any combination of the foregoing. Connections 250-262 represent end-points in a communication, it should be understood that various intermediaries can facilitate the linkages represented by connections 250-262. In some embodiments, radio system 100 can opportunistically search out a connection (e.g., connections 250-262). For example, radio system 100 can detect an unsecured ("open") WiFi connection. Radio system can prioritize between various connections 250-262. In some embodiments, radio system 100 uses one connection to acquire configuration information about another connection. For example, radio system 100 can communicate over a low-bandwidth radio network to acquire authorization keys that can be used to connect to a high-speed wired network. In some embodiments, radio system 100 can utilize frequency hopping for a variety of purposes, for example, to find the best frequency or collection of frequencies (e.g., best signal to noise ratio) or to minimize radio interference that may come in random bursts in one channel. In some embodiments, radio system can utilize protocol hopping in addition to (or instead of) frequency hopping for a variety of purposes. For example, as bandwidth and signal strength demands change, radio system 100 and a connected device can hop between 4G, 5G, Wi-Fi, Bluetooth, and NFC while still retaining interconnectivity. If one frequency or protocol becomes undesirably crowded, radio system 100 can attempt "hopping" to another frequency or protocol.

The principles herein disclosed can provide advantages within a cloud infrastructure. A cloud, in networking contexts, is a method and system that hides underlying complexities of the system. For example, a cloud storage solution presents a user with a certain amount of continuous available storage space, despite the fact that the storage may reside on multiple disks, machines, and networks. If one disk fails, a network engineer can repair the disk using a backup without needing to notify the user. The cloud therefore allows a user to interact with a simplified representation of resources while a separate entity maintains the underlying infrastructure.

The principles in this disclosure facilitate a cloud based radio system whereby a user can request a wireless resource on a certain frequency/band/channel, modulation technique, protocol, and geographical location/area. The user can also request a data connection between the wireless resource and other networked resources. For example, a user might have a preexisting cloud network infrastructure and the user might request a virtual machine be provisioned that will attach to physical wireless resources in a certain region. The underlying infrastructure of the machines, radio systems, and networking components, can be hidden from the user. In this way, radio system 100 can be presented as a "radio virtual machine." In some embodiments, radio system 100 has an "abstraction" layer whereby multiple virtual radio machines can be installed on one radio system 100 without one virtual radio machine interfering or detecting another virtual radio machine on the same host. Multiple radio systems 100 can be presented as a single entity to a user requesting the resource. Also, multiple radio systems 100 can be presented as a single entity to a client that connects with radio systems 100. Radio system 100 can have a secure tunnel with other network resources. The tunnel can be established by configuration server 202.

Figure 3:
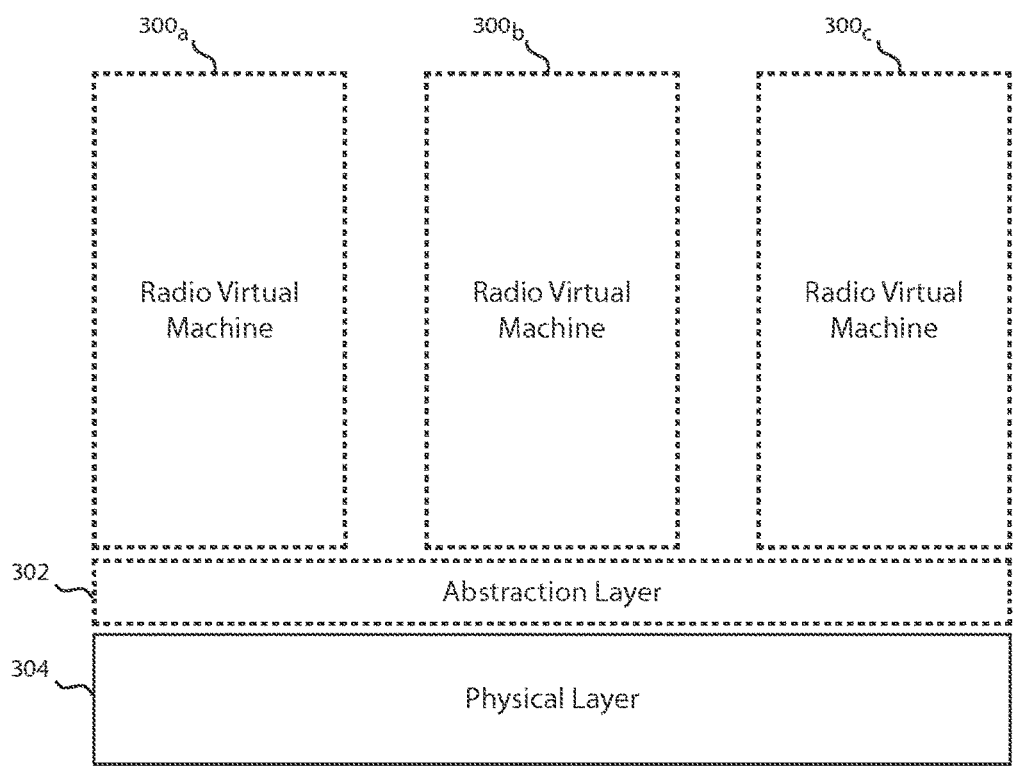
FIG. 3 shows various radio virtual machines operating on one physical layer.

FIG. 3 shows various radio virtual machines $300_a$-$300_c$ operating on one physical layer 304 (i.e., radio system 100). An abstraction layer 302 can manage the physical resources from the physical layer 304 and present virtual interfaces for the physical resources to radio virtual machines $300_a$-$300_c$. In some embodiments, radio virtual machines $300_a$-$300_c$ are associated with different users/clients and are isolated from one another. For example, radio system 100 can service one client/user using one radio virtual machine 300 and service another client/user using another radio virtual machine 300. In some embodiments, each of these radio virtual machines can operate on using separate radios, frequencies, protocols, etc.

Figure 4A:
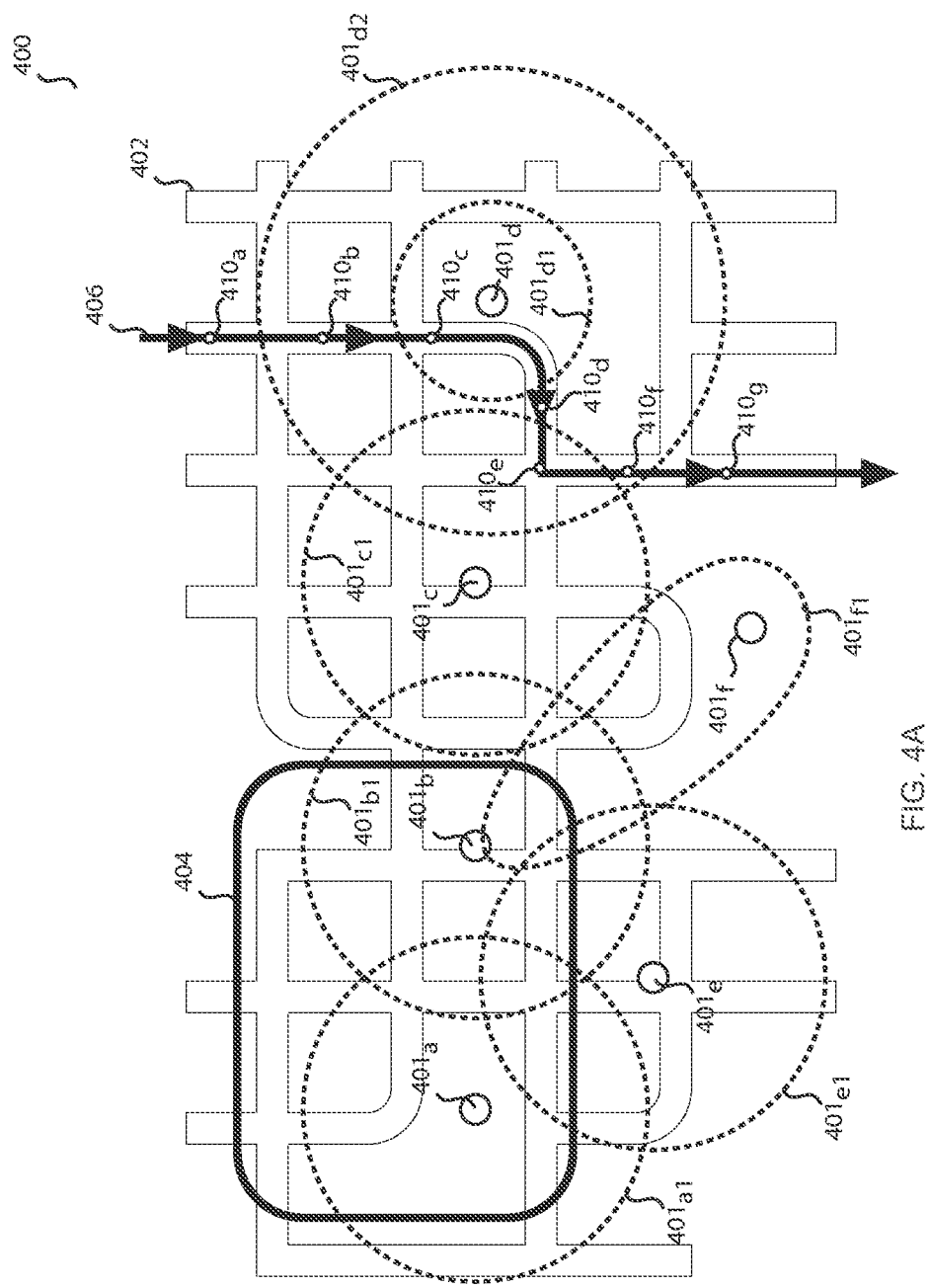
FIG. 4A shows various radio systems positioned throughout an example city building layout.

FIG. 4A shows various radio systems $401_a$-$401_f$ positioned throughout example city layout 402. Radio systems $401_a$-$401_f$ can be various example embodiments of radio system 100. Traditionally, radio emitter placement within a city can become a complex ordeal, requiring skilled network engineers to configure and place with meticulous precision. Interference, coverage, power, and cost constraints increase the complexity of provisioning a static system.

The principles disclosed herein can be applicable to such static systems, yet applying these principles to dynamic systems can provide additional operational efficiencies. For example, configuration server 202 can determine that various radio systems such as radio systems $401_a$ and $401_b$ overlap in coverage; it can then lower the power output of one of the radio systems or change their carrier channel to avoid destructive interference. In some embodiments, configuration server 202 coordinates radio systems with overlapping signals such that an overlapping area creates constructive interference, increased throughput, or error correction. In some embodiments, configuration server 202 can dynamically allocate guard bands in order to minimize interference from channels that are close in frequency. Configuration server 202 can dynamically allocate subcarriers between radio systems. Configuration server 202 can also establish usage priorities and provide sharing algorithms that enable multiple radio systems $401_a$-$401_f$ protocols, and client devices share wireless spectrum.

In some embodiments, radio systems 100 can report on the wireless signals they detect from other radio systems 100. For example, radio system $401_b$ might detect a signal from radio system $401_a$. Radio system $401_b$ can then report on the quality of the signal to configuration server 202. For example, radio system $401_b$ can report that the signal is subject to a certain degree of noise, contains reflections (similar to an acoustic echo), or other descriptive qualities known in the art. Configuration server 202 can then diagnose any problems with the current configuration of radio system $401_a$ and further configure radio system $401_a$ to overcome the problems. For example, configuration server 202 can configure radio system $401_a$ to speed up/slow down its clock, change frequencies, change power output, etc. With data from various radio systems, configuration server 202 can minimize conflicts between radio systems.

Radio coverage can be provided in region 404. For example, a trade convention might take place within region 404 and the organizers of the convention can request WiFi coverage within region 404 that bears the conference name (e.g., "Conference WiFi"). In some embodiments, all radio systems within region 404 can be configured to provide radio coverage (e.g., radio system $401_a$ and radio system $401_b$); alternatively, radio systems that can cover region 404 can be configured to provide radio coverage (e.g., radio system $401_a$ radio system $401_b$, radio system $401_f$ and radio system $401_e$). In some embodiments, radio systems $401_e$-$401_f$ estimate their coverage region $401_{a1}$-$401_{d1}$ and $401_{d2}$. In some embodiments, configuration server 202 estimates the respective coverage regions $401_{a1}$-$401_{d1}$ and $401_{d2}$. These estimations can be calculated based on power output and frequency noise as well as historical coverage regions (i.e., a record of the location of devices that have been able to connect with each radio system $401_a$-$401_f$).

In some embodiments, the location of radio system 100 can be determined using GPS module 104 in radio system 100. Alternatively, the location can be determined using other data such as sunrise/sunset, nearby wireless signatures that have known locations (e.g., detecting a cell tower ID and looking up its location in a database), or based on where radio system 100 was installed. Radio system 100 can make this location determination itself or configuration server 202 can assist in making this determination. In some embodiments, after detecting its location (whether by using GPS module 104, detecting nearby wireless signals of known origin, or other means) radio system 100 can communicate its location to other devices (e.g., other radio systems and/or client devices).

Example radio system $401_f$ shows how radio system 100 can configure its coverage region $401_{f1}$ to cover a certain area within region 404. Coverage region $401_{f1}$ depicts a possible directed region, e.g., it sacrifices coverage in some areas and enhances coverage in others. This can be accomplished through beam forwarding or physically changing the direction of an antenna or a reflector. Example radio system $401_d$ shows how radio system 100 can configure its coverage region to be smaller (coverage region $401_{d1}$) or larger (coverage region $401_{d2}$). This can be accomplished by adjusting the power output of the radio. Configuration server 202 can instruct radio systems $401_a$-$401_f$ to adjust their coverage regions $401_{a1}$-$401_{d1}$ and $401_{d2}$. Alternatively, radio systems $401_a$-$401_f$ can adjust their coverage regions $401_{a1}$-$401_{d1}$ and $401_{d2}$ without instruction. It should be understood that coverage regions $401_{a1}$-$401_{d1}$ and $401_{d2}$ can be different for different frequencies, protocols, and networks. For example, coverage region $401_{d1}$ can correspond to a WiFi network with one SSID while coverage region $401_{d2}$ can correspond to a WiFi network with another SSID.

In some embodiments, the relative location of a connected device and radio systems $401_a$-$401_f$ might change over time. For example, example route 406 represents a possible path of a connected device as it passes through locations $410_a$-$410_g$. At location 410, the connected device is not within any available coverage region. At location $410_b$, the connected device is within coverage region $401_{d2}$. As the connected device moves to location $410_c$, radio system $401_d$ can decrease power so that it covers coverage region $401_{d1}$ and similarly increase power when the connected device moves to location $410_d$. As the connected device moves to location $410_e$, it will be within coverage region $401_{d2}$ and coverage region $401_{c1}$. In some embodiments, example route 406 can represent a connected device moving (e.g., a person driving through a city or walking around a building while carrying the connected device). Alternatively, example route 406 can represent radio systems $401_a$-$401_f$ moving (e.g., attached to aerial balloons), or movement of both the connected device and the radio systems $401_a$-$401_f$.

In position $410_e$, the connected device can be within coverage region $401_{c1}$ and $401_{d2}$. In some embodiments, the connected device will have two active connections, one with radio system 401, and another with radio system $401_d$. These active connections can be on different radio frequencies. Data that is to be received by the connected device can pass through the either connection or both. Specifically, the another radio system $401_d$ can gain access to network services or otherwise provide access to the network services through the neighboring radio system 401. Alternatively, radio systems 401, and $401_s$ can both facilitate the connection by sending data so that it arrives at position 410, simultaneously and with constructive interference; in some such embodiments, the connected device can be ignorant of the duplicative radio systems. Alternatively, configuration server 202 can facilitate a "hand-off" between radio system $401_c$ and $401_d$. For example, connected device can establish a session with an internet resource via radio system $401_d$ and configuration server 202; once connected device is at position $410_e$, configuration server 202 can determine that a hand-off should occur and instructs radio $401_c$ to connect with connected device; and configuration server can begin routing the session data through radio system $401_c$. Determining a hand-off should occur can be based on a variety of factors. For example, configuration server 202 can instruct newly discovered radio systems to always take the connection, it can have the radio system with the strongest signal maintain the connection, or it can predict what radio system's signal may drop and establish the connection through the other radio system.

In various embodiments, a position of the radio system 401, as it changes, can be transmitted from the radio system 401 to a central control server. The central control server can generate configuration instructions for configuring the radio system 401 based on the changing position of the radio system 401. Subsequently, the radio system 401 can be configured based on the generated configuration instructions. For example, the central control server can send the configuration instructions, generated based on the changing position of the radio system 401, to the radio system 401. Further in the example, the radio system 401 can use the configuration instructions received from the central control server to actually configure itself.

Figure 4B:
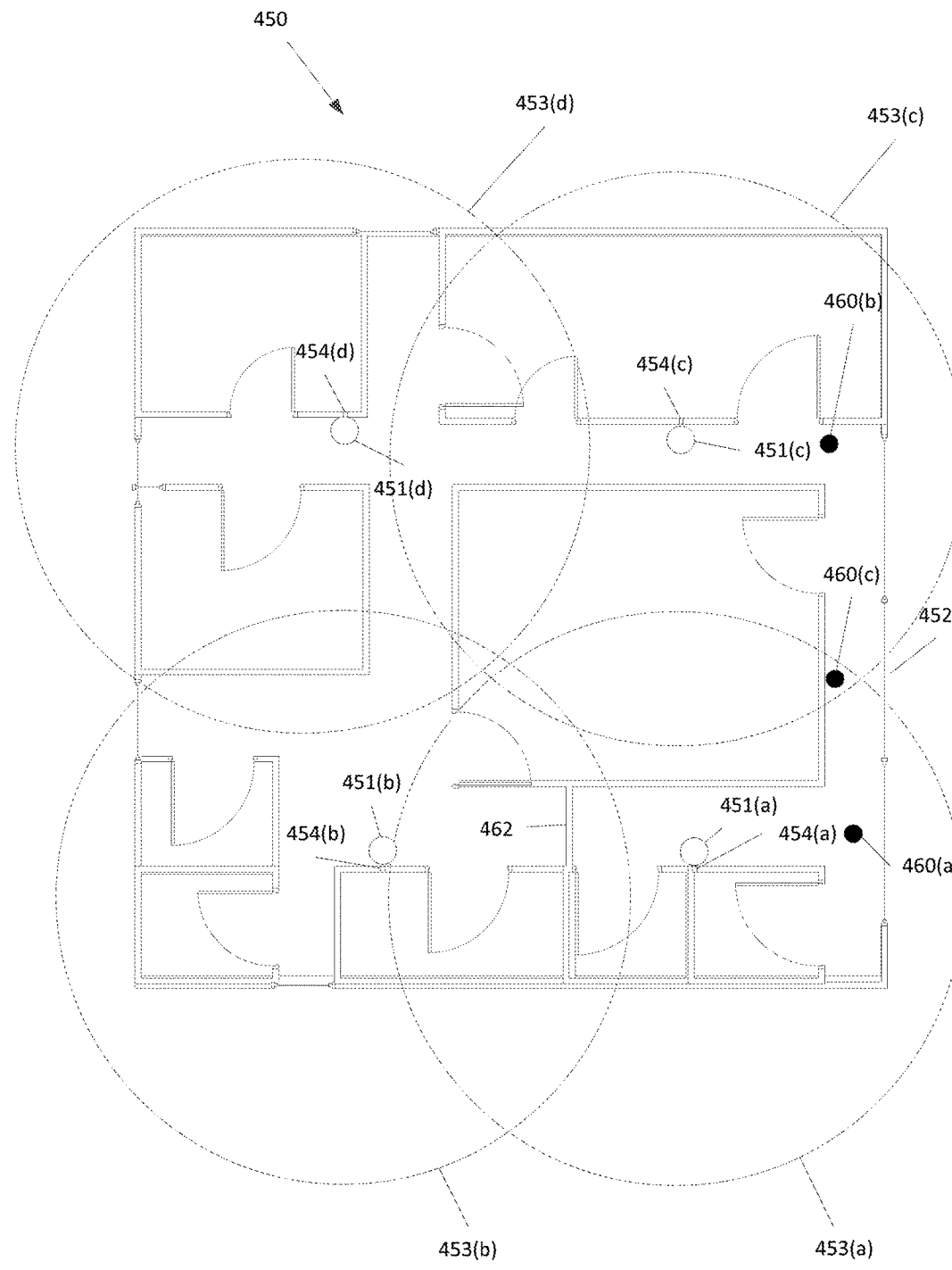
FIG. 4B shows various radio systems positioned throughout an example building layout.

FIG. 4B shows various radio systems 451(a)-451(d) positioned throughout an example building layout 452. In some embodiments, the radio systems 451(a)-451(d) may provide extended wireless network coverage, for example via conventional 2G, 3G, and 4G networks. In some embodiments, the extended wireless network coverage can include 5G networks. Traditionally, wireless networks serving mobile phones operate at high frequencies in order to achieve one or more of increased bandwidth and reduced latency, although these high frequencies are associated with reduced penetration (e.g. through walls and buildings). As such, it is contemplated that radio systems 451(a)-451(d) can be arranged indoors in order to provide suitable extended service coverage for high frequency signals that otherwise suffer from reduced penetration. For example, the radio system 451(a)-451(d) can use lower frequencies to communicate with a client indoors and subsequently communicate over a high frequency network (e.g. a 4G network) to a network backhaul.

In some embodiments, a radio system (e.g., 451(a)) can report on the wireless signals they detect from other radio systems (e.g., 451(b)-(d)). For example, radio system 451(b) might detect a signal from radio system 451(a). Radio system 451(b) can then report on the quality of the signal to configuration server 202. For example, radio system 451(b) can report that the signal is subject to a certain degree of noise, contains reflections (similar to an acoustic echo), or other descriptive qualities known in the art. Configuration server 202 can then diagnose any problems with the current configuration of radio system 451(a) and further configure radio system 451(a) to overcome the problems. For example, configuration server 202 can configure radio system 451(a) to speed up/slow down its clock, change frequencies, change power output, etc. With data from various radio systems, configuration server 202 can minimize conflicts between radio systems.

Wireless network coverage can be provided throughout building interior 452. Radio systems 451(a)-451(d) broadcast associated wireless network signals 453(a)-453(d) forming a network (e.g., mesh, etc.) providing extended mobile network coverage. Each area of expanded coverage 453(a)-453(d) grants users stable and otherwise increased signal strength for their mobile phone. Overlapping and closely positioned coverages areas 453(a)-453(d) ensure that total or near-total mobile wireless network coverage can be obtained indoors and regardless of wall thickness or material. For example, in situations where higher frequency mobile wireless networks would otherwise be unable to penetrate into building interior 452, radio systems 451(a)-451(d) may provide such extended coverage.

In other embodiments, radio systems 451(a)-451(d) may relay high frequency signals (e.g., 600 MHz to 6 GHz, 24-86 GHz, 30-300 GHz, etc.) to locations that are not readily accessible to these signals (e.g., based on the frequency signal characteristics). Generally, low frequency signals can travel further and have better penetration than high frequency signals. High frequencies (e.g., millimeter waves, etc.) can offer faster speeds (e.g., transfer data at high rates—20 gigabits per sec, etc.), but are limited in range, penetration, and can be absorbed easier. For example, some frequency signals can provide more consistent coverage, regardless of interior walls, but will be limited in both bandwidth and range of coverage. Specifically, the radio systems 451(a)-451(d) can be configured to receive high frequency signals, e.g. from a network backhaul. The radio system 451(a)-451(d) can transmit data received in the high frequency signals as low frequency signals to other radio systems and/or clients. This can effectively extend the range of a network, e.g. a high frequency network such as 4G, into a building. Conversely, the radio system 451(a)-451(d) can receive low frequency signals and transmit data in the low frequency signals to a network backhaul through high frequency signals.

As such, it is also contemplated that radio systems 451(a)-451(d) can be arranged nearby each other, even with walls between them, in order to extend the range of such mobile wireless networks operating at certain frequency signals (e.g., 600 MHz to 6 GHz, 24-86 GHz, 30-30 GHz, etc.). As depicted by FIG. 4B, radio system 451(a) may relay high frequency signal (e.g., via low frequency wireless network signal) with associated coverage area 453(a). Radio system 451(b) may receive and broadcast the low frequency signal of coverage zone 453(a), extending the coverage of the higher frequency signals to associated coverage zone 453(b). Furthermore, because the wireless network signal is of a low frequency, it is able to be transmitted through intervening wall 462. In this way, a low frequency wireless network may be extended to cover regions beyond its otherwise shortened range.

In some embodiments, radio systems 451(a)-451(d) may be plugged into power outlets 454(a)-454(d). In such embodiments, radio systems 451(a)-451(d) may themselves include integrated power outlets capable of delivering power to an external device. In this way, radio systems 451(a)-451(d) are capable of being dispersed throughout a building interior discretely and without sacrificing the use of a power outlet for other devices.

In yet another embodiment, radio systems 451(a)-451(d) may be connected over a wired connection to network interfaces/cable modems (not depicted). When plugged into network interfaces/modems, radio systems 451(a)-451(d) may provide the possibility of connecting to a backhaul server 206 as discussed above. Cell phones connecting to backhaul server 206 over coverage zones 454(a)-454(d) and through radio systems 451(a)-451(d) may retrieve information or files directly from the server.

In some embodiments, the connected device will have two active connections. For example, a device located at position 460(c) may be connected to radio system 451(a) while also connected to radio system 451(c). These active connections can be to different networks such as to a mobile wireless network and a WiFi network or may be of varying frequencies such as a low frequency signal and a high frequency signal. Data that is to be received by the connected device can pass through either connection or both. Depending on device settings, a default network preference may be utilized to avoid, for example, data network charges from a mobile wireless network provider. Alternatively, radio systems 451(a) and 451(c) can both facilitate the connection by sending data so that it arrives at position 460(c) simultaneously and with constructive interference; in some such embodiments, the connected device can be ignorant of the duplicative radio systems and still experience increased signal strength. Alternatively, configuration server 202 can facilitate a "hand-off" between radio system 451(a) and 451(c). For example, connected device at position 460(a) can engage in a phone call via radio system 451(a) and configuration server 202; once connected device is at position 460(c), configuration server 202 can determine that a hand-off should occur and instructs radio 451(c) to connect with connected device and carry the call; and configuration server can begin routing the session data through radio system 451(c) so that the call is not dropped when the device is at position 460(b) and thus out of the service zone 453(a) of radio system 451(a). Determining a hand-off should occur can be based on a variety of factors. For example, configuration server 202 can instruct newly discovered radio systems to always take the connection, it can have the radio system with the strongest signal maintain the connection, or it can predict what radio system's signal may drop and establish the connection through the other radio system.

Figure 5A:
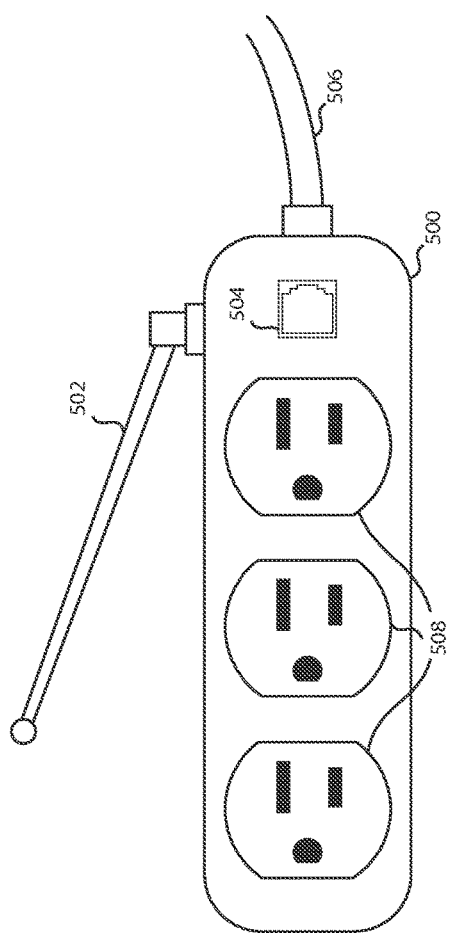
FIG. 5A and FIG. 5B depict example radio system embodiments.
Figure 5B:

FIG. 5A and FIG. 5B depict example radio system 100 embodiments. For example, power strip 500 can house the components of radio system 100 as well as various other components. For example, power strip 500 can have power cable 506 that can be plugged into the wall for power and also have power outlets to provide power for other devices and appliances. Additionally, power strip 500 can have antenna 502 connected to radio 110 of radio system 100 as well as Ethernet plug 504 for wired networking interface 116. In some embodiments, Ethernet plug 504 can be connected to a router for network (e.g., internet) access; alternatively, power strip 500 can gain network access via power cable 506.

FIG. 5B depicts an example radio system 100 embodiment. For example, radio tower 550 can comprise controller 560 which can house some components of radio system 100 (e.g., processor 102, memory 106, wired net-working interface 116, power 114, etc.). WiFi antenna 558, cellular antenna 556, directional antenna 554, and TV antenna 552 can all facilitate connections on various frequencies and with various power outputs. In some embodiments, directional antenna 554 is configured to establish a dedicated connection with another radio tower 550, an orbiting satellite constellation, configuration server 202, etc. Solar panel 562 can provide power to controller 560 and the other components on radio tower 550.

In some embodiments, radio tower 550 can be placed in remote locations to provide wireless connectivity where running wires is not cost effective. For example, radio tower 550 can be placed (discretely) near a beautiful vista at the end of a mountain hike. This can enable a hiker to connect to the internet and send a picture that they just took at the location. A radio tower 550 placed in remote locations can also provide cellular coverage for cellular users to connect with emergency personnel in case of an accident. In some embodiments, radio tower 550 can be mobile and can be placed where a temporary and unmet demand is present, for example for a sporting event or a disaster area where the present infrastructure might be damaged or at capacity.

Figure 6A:
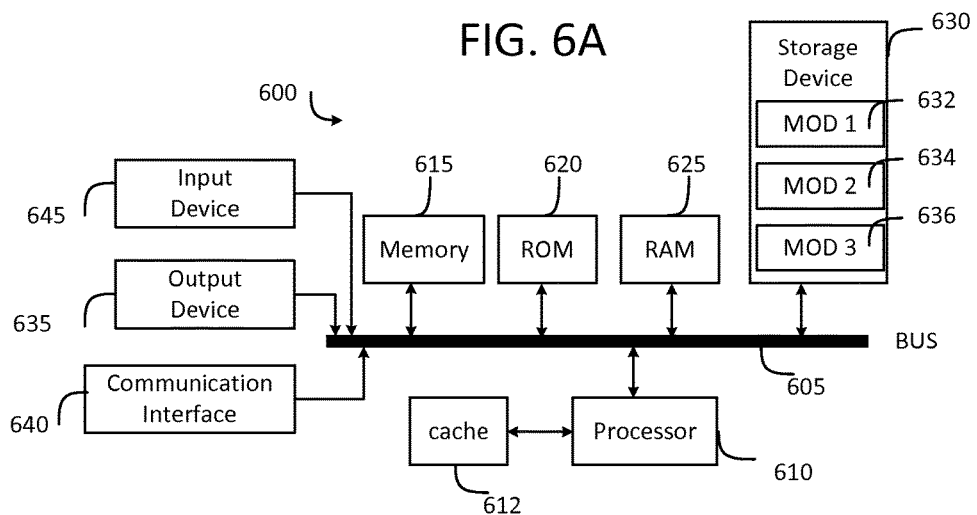
FIG. 6A and FIG. 6B illustrate example possible system embodiments.
Figure 6B:
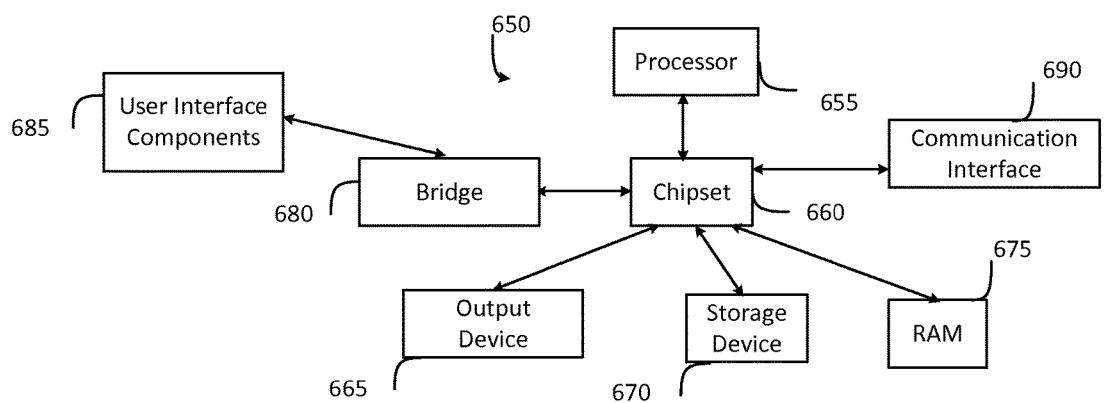

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 637, module 7 634, and module 3 636 stored in storage device 630, configured to control the processor 910 as well as a special-purpose processor where software instructions are incorporated into the actual processor design. The processor 610 may essentially be a completely self-contained computing system, containing multiple cores or processors, a bus, memory controller, cache, etc. A multi-core processor may be seemmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 670, and hybrids thereof.

The storage device 630 can include software modules 637, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A radio system comprising:
a processor;
one or more antennas;
a memory implemented at the radio system containing instructions that when executed by the processor, enable the radio system to:
identify, at the radio system, a location of the radio system;
send a location signal over a first network indicating the location of the radio system;
receive, over the first network, first configuration data for configuring the radio system to communicate over a second network based on the location of the radio system;
receive, over the first network, second configuration data for configuring the radio system to communicate over a third network, based on the location of the radio system;
configure the radio system using the first configuration data and the second configuration data to communicate over the second network and the third network based on the location of the radio system through protocol hopping between the second network and the third network; and
provide network service access over the second network according to the first configuration data based on the location of the radio system.

2. The radio system of claim 1, wherein the first network is a cellular network.

3. The radio system of claim 1, wherein the second network is a WiFi compliant network.

4. The radio system of claim 1, wherein the location of the radio system is identified at the radio system based on a signal received from a neighboring device of the radio system.

5. The radio system of claim 4, wherein the neighboring device is a device attempting to access network services through the radio system.

6. The radio system of claim 4, wherein the location of the radio system is identified by the radio system based on a signal received from the neighboring device.

7. The radio system of claim 4, wherein the location of the radio system is identified by the radio system based on a location of the neighboring device.

8. The radio system of claim 1, wherein the instructions when executed by the processor are further configured to enable the radio system to:
receive a second signal over the third network at a third signal strength; and
transmit the second signal received over the third network at a fourth signal strength different than the third signal strength;
receive the second configuration data for configuring the radio system to communicate over the third network in response to transmitting the second signal at the fourth signal strength.

9. The radio system of claim 8, wherein the instructions when executed by the processor are further configured to enable the radio system to send the location of the radio system along with the second signal at the fourth signal strength and the second configuration data generated based on the location of the radio system.

10. The radio system of claim 8, wherein the second signal is transmitted by the radio system at the fourth signal strength over the second network.

11. A method comprising:
identifying, at a radio system, a location of the radio system;
sending a location signal over a first network indicating the location of the radio system;

receiving, over the first network, first configuration data for configuring the radio system to communicate over a second network based on the location of the radio system;

receiving, over the first network, second configuration data for configuring the radio system to communicate over a third network, based on the location of the radio system;

configuring the radio system using the first configuration data and the second configuration data to communicate over the second network and the third network based on the location of the radio system through protocol hopping between the second network and the third network; and providing network service access over the second network according to the first configuration data based on the location of the radio system.

12. The method of claim 11, wherein the first network is a cellular network.

13. The method of claim 11, wherein the second network is a WiFi compliant network.

14. The method of claim 11, wherein the location of the radio system is identified at the radio system based on a signal received from a neighboring device of the radio system.

15. The method of claim 14, wherein the neighboring device is a device attempting to access network services through the radio system.

16. The method of claim 14, wherein the location of the radio system is identified by the radio system based on a signal received from the neighboring device.

17. The method of claim 14, wherein the location of the radio system is identified by the radio system based on a location of the neighboring device.

18. The method of claim 11, further comprising:
receiving a second signal over the third network at a third signal strength; and
transmitting the second signal received over the third network at a fourth signal strength different than the third signal strength;
receiving the second configuration data for configuring the radio system to communicate over the third network in response to transmitting the second signal at the fourth signal strength.

19. The method of claim 18, further comprising sending the location of the radio system along with the second signal at the fourth signal strength and the second configuration data generated based on the location of the radio system.

20. The method of claim 18, wherein the second signal is transmitted by the radio system at the fourth signal strength over the second network.

* * * * *